Dec. 30, 1941.  W. R. APPLEMAN  2,267,805
ELECTRIC MOTOR
Filed Dec. 27, 1938  3 Sheets-Sheet 1

Inventor
Wilbur R. Appleman
By Isabella Jones
Attorney

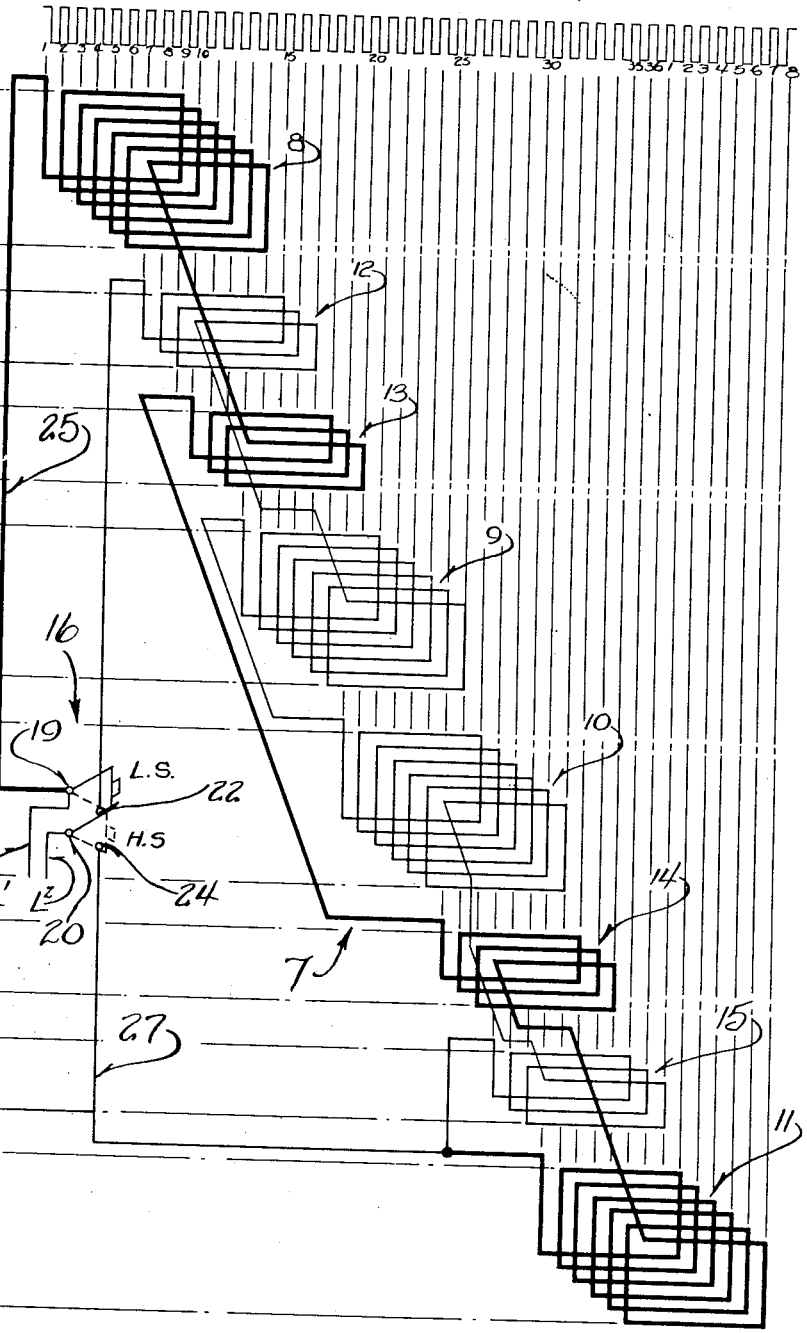

Patented Dec. 30, 1941

2,267,805

UNITED STATES PATENT OFFICE 2,267,805

ELECTRIC MOTOR

Wilbur R. Appleman, Wausau, Wis., assignor to Marathon Electric Manufacturing Corporation, Wausau, Wis., a corporation of Wisconsin Application December 27, 1938, Serial No. 247,864

7 Claims. (Cl. 172—274)

This invention relates to electric motors, and refers particularly to the stator windings of two speed split phase motors.

In general, applicant's invention consists in obtaining two speed operation of a motor provided with a single progressively wound main winding.

The operating speed of a split motor or any other induction type motor, as is well known, may be changed by changing the number of its stator poles. As the number of poles is reduced, the speed of the motor is increased and vice versa; and as the number of poles is determined by the grouping of the coils constituting the main winding and the manner in which the coil groups are connected, it is possible to change the number of poles and consequently the operating speed of the motor by effecting the necessary changes in the coil groupings.

This invention utilizes this characteristic of a split phase or other induction motor and has, as one of its objects, to provide means whereby merely the actuation of a two position speed selector switch effects the necessary re-grouping of the coils to obtain the desired change in the number of poles.

This is accomplished by dividing the main stator winding into at least two winding sections each comprising a plurality of groups of coils and so connected with each other that in one position of the switch the winding sections are in series to produce the maximum number of poles and low speed operation, and in the other position of the switch, the winding sections are connected in parallel to produce a lesser number of poles and high speed operation of the motor.

Another object of this invention is to provide two separate starting windings, one having a number of coils corresponding to the number of poles in use for low speed operation, and the other having a number of coils corresponding to the number of poles in use for high speed operation.

Another object of this invention is to provide means whereby a single switch not only selects the proper coil connections in the main winding to effect the desired number of poles, but also connects the proper starting winding in circuit.

A further object of this invention is to provide means whereby certain of the groups of coils are omitted, i. e. are out of circuit for low speed operation to thus provide a stronger torque.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which:

Figure 3 is a full winding diagram of the motor illustrated in Figure 1.

Figure 1:
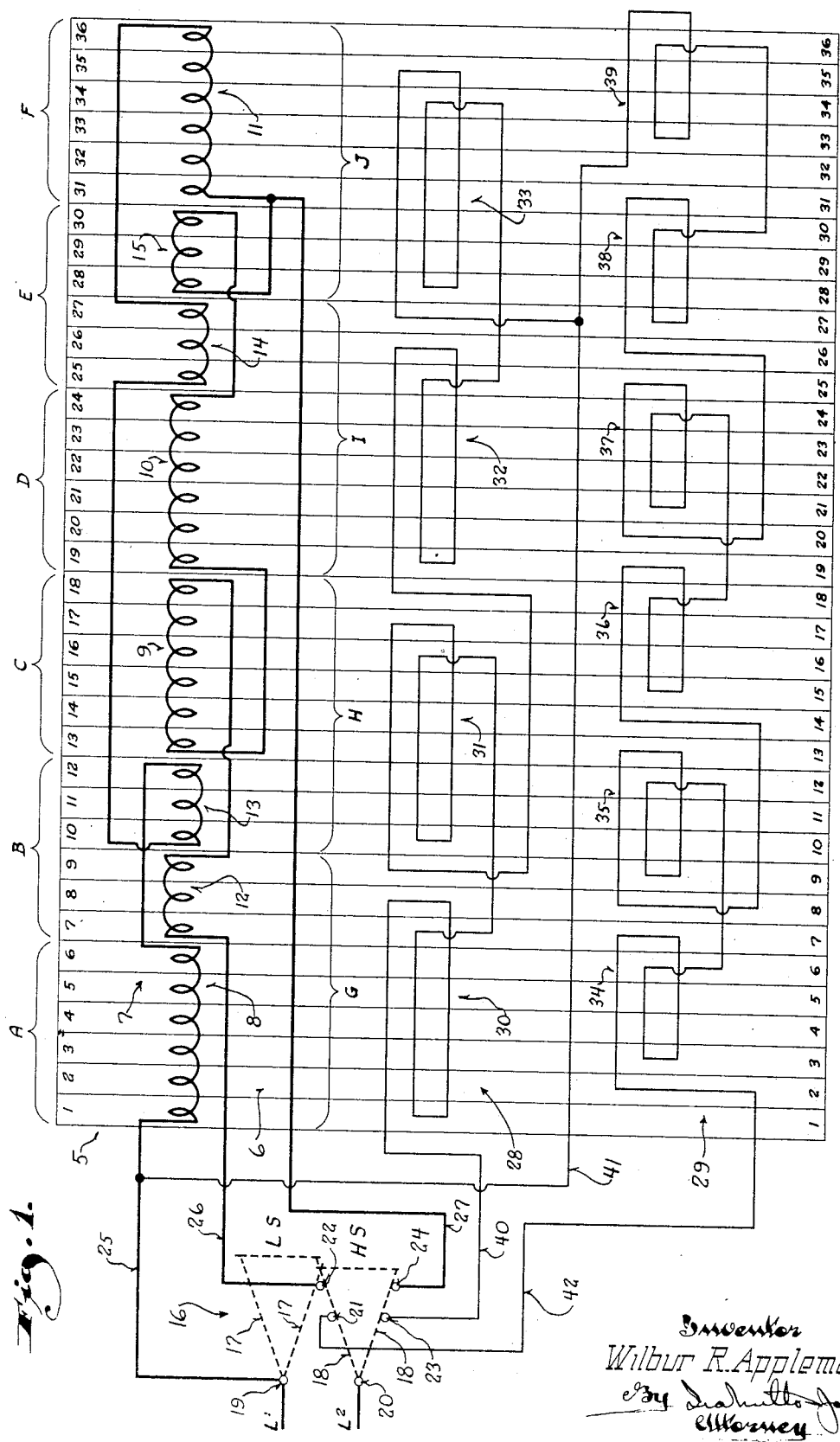
Figure 1 is a diagrammatic representation of a stator having a main winding and two starting windings and illustrating the manner in which the groups of coils of the main winding may be connected to produce either four or six poles.

Referring now particularly to the accompanying drawings (and especially to Figures 1 and 3) in which like numerals indicate like parts, the numeral 5 represents the stator laminations of a split phase motor, which in this case has thirty-six slots diagrammatically represented by the thirty-six divisions designated 6 and numbered across the top and bottom for convenience.

The main winding 7 consists of thirty-six coils applied progressively to the stator and is divided into two main winding sections. The coils of each section are arranged in groups, there being a total of four groups, 8, 9, 10, and 11 of six adjacent coils each and four groups, 12, 13, 14, and 15 of three adjacent coils each.

To preclude any possible misunderstanding of the terms here used, a coil comprises a number of turns of wire embracing a predetermined number of stator teeth, and an adjacent coil would likewise comprise a number of turns of wire embracing a predetermined like number of stator teeth but displaced circumferentially from the first coil by the arcuate width of one stator tooth.

The coil groups 8, 13, 14 and 11 are connected serially in one section of the winding, and the remaining coil groups 12, 9, 10 and 15 are connected serially in the other section of the winding. Although the coil groups of each winding section are serially connected, attention is directed to the fact that in each winding section some of the coil groups are connected to have current flow therein in one direction while the remaining coil groups are connected to have current flow therein in the opposite direction at any given instant.

The coil groups of the winding sections are so located circumferentially with respect to each other that coil groups of one winding section are interposed between coil groups of the other winding section at points such that when the winding sections are connected to a supply line by means of a two position speed selector switch, designated generally by the numeral 16, the two winding sections may be selectively connected either in series across the line to produce six poles and low speed operation, and/or in parallel to reverse the direction of current flow in the coil groups 12, 9, 10 and 15 constituting one of the winding sections to effect a reduction in the number of poles to four for high speed operation.

This is accomplished by connecting the two winding sections together at one end to provide a terminal common to both winding sections, and by connecting, either the free ends of the winding sections with both sides of the supply line for the series connection, or connecting the free ends of both winding sections with one side of the supply line and the other side of the supply line with the common terminal of the winding sections by means of the selector switch.

The speed selector switch may be of any suitable type and in the present instance has been diagrammatically illustrated as comprising two contactors 17 and 18, electrically insulated but joined for concomitant movement. These contactors are respectively connected with contacts 19 and 20, to which supply lines L¹ and L² connect.

In the low speed position of the switch designated LS, the contactor 17 is open, that is, it does not engage any stationary contact; but the contactor 18 engages contacts 21 and 22.

In the high speed position of the switch indicated by the characters HS, the contactor 17 engages the contact 22 and the contactor 18 engages contacts 23 and 24.

The free end of the winding section containing the coil groups 8, 13, 14 and 11 is permanently connected through a conductor 25 with the contact 19, and consequently, the line L¹. Another conductor 26 leads from the contact 22 to the free end of the other winding section containing the coil groups 12, 9, 10 and 15, and a third conductor 27 leads from contact 24 to the common terminal at the opposite ends of the winding sections. Hence, it will be seen that when the speed selector switch is in its low speed position LS, the two winding sections and their several groups of coils are connected in series to produce six poles and low speed operation.

In this instance, beginning with contact 19 which is connected with line L¹ and the free end of the winding section consisting of the coil groups 8, 13, 14 and 11, current may flow as follows: along conductor 25 to six coil group 8, forwardly or in a counterclockwise direction therethrough, then backwardly or in a clockwise direction through three coil group 13, forwardly through three coil group 14, backwardly through six coil group 11 to the common terminal of the winding sections and entering the other winding section at one end of the three coil group 15, forwardly therethrough, backwardly through six coil group 10, forwardly through six coil group 9, backwardly through three coil group 12, and out through conductor 26 to line L²; it being understood that forwardly may be interpreted as counterclockwise current flow and backwardly as clockwise current flow in the coils of the groups, as shown particularly in Figure 3.

In this manner, the three coil groups 12 and 13 and the three coil groups 14 and 15 have been added together to form two composite six coil groups. Thus, there are six six coil groups A, B, C, D, E, and F; and as current flows in opposite directions in these six adjacent coil groups, six poles are produced, three north poles and three south poles. This is the number of poles employed in this instance for low speed operation.

When the switch is actuated to its high speed position, the direction of current flow through the winding section composed of the coil groups 12, 9, 10 and 15, is reversed and the two winding sections connected in parallel to reduce the number of poles to four. The circuit for the main winding now is as follows: again entering on conductor 25 which is connected with line L¹ and the free end of the winding section composed of the coil groups 8, 13, 14 and 11, current flows forwardly or in a counterclockwise direction through six coil group 8, backwardly or in a clockwise direction through three coil group 13, forwardly through three coil group 14, and backwardly through six coil group 11 to the common terminal.

Inasmuch as the free ends of both winding sections are now connected to line L¹ current also flows from line L¹ through conductor 26 forwardly or counterclockwise through three coil group 12, backwardly or clockwise through six coil group 9, forwardly through six coil group 10, and backwardly through three coil group 15 to the common terminal of the winding sections, and out through conductor 27 to contact 24 and consequently line L² because of the then position of the switch 16.

It will now be seen that current flows forwardly or in a counterclockwise direction in six coil group 8, and adjacent three coil group 12 and likewise in six coil group 10, and adjacent three coil group 14, and that it flows backwardly or in a clockwise direction in three coil group 13 and adjacent six coil group 9, and, likewise, in three coil group 15 and adjacent six coil group 11.

Thus it is apparent that this parallel connection of the two winding sections, in reversing the polarity of the coil groups 12, 9, 10 and 15, effects combining of coil groups of both winding sections and results in producing four composite nine coil groups G, H, I and J to produce four poles, and consequently, high speed motor operation.

From the description thus far, it will be evident that merely through the actuation of the two position speed selector switch to connect the winding sections either in series or in parallel, the various groups of coils of the winding sections are combined in two different ways, one of which forms one number of poles and one motor speed, and the other of which forms another number of poles and a different motor speed. An extremely simple manner of effecting two speed operation is thus obtained.

Optimum starting conditions for the two speeds are assured through the provision of a high speed starting winding 28, and a low speed starting winding 29. The high speed starting winding is arranged in four concentric coils 30, 31, 32, and 33 properly displaced with respect to the four poles G, H, I, and J, respectively; and a low speed starting winding is arranged in six concentric coils 34, 35, 36, 37, 38, and 39, properly displaced with respect to the six poles A, B, C, D, E, and F.

The proper starting winding is connected in the circuit automatically by the actuation of the speed selector switch as follows: when the switch is in its high speed position HS so that the main winding is divided into four poles as described hereinbefore, one end of the high speed starting winding is connected with line L² through a conductor 40, which leads to the contact 23 and the other end of the high speed starting winding is connected with the line L¹ through a conductor 41, which is shown joined to conductor 25.

When the speed selector switch is in its low speed position LS, one end of the low speed starting winding is connected with line L¹ through the common conductor 41 and the other end thereof is connected with the line L² through a conductor 42, which leads to contact 21.

It is, of course, to be understood that the customary centrifugal switch, which has not been shown, is provided to disconnect the operative starting winding upon attainment of running speed; and that while the use of two starting windings assures a much more satisfactory motor than one having but a single starting winding, the latter construction may be used. In this case, however, it would be necessary to omit approximately half the normal winding in order to prevent a bucking effect.

Figure 2:
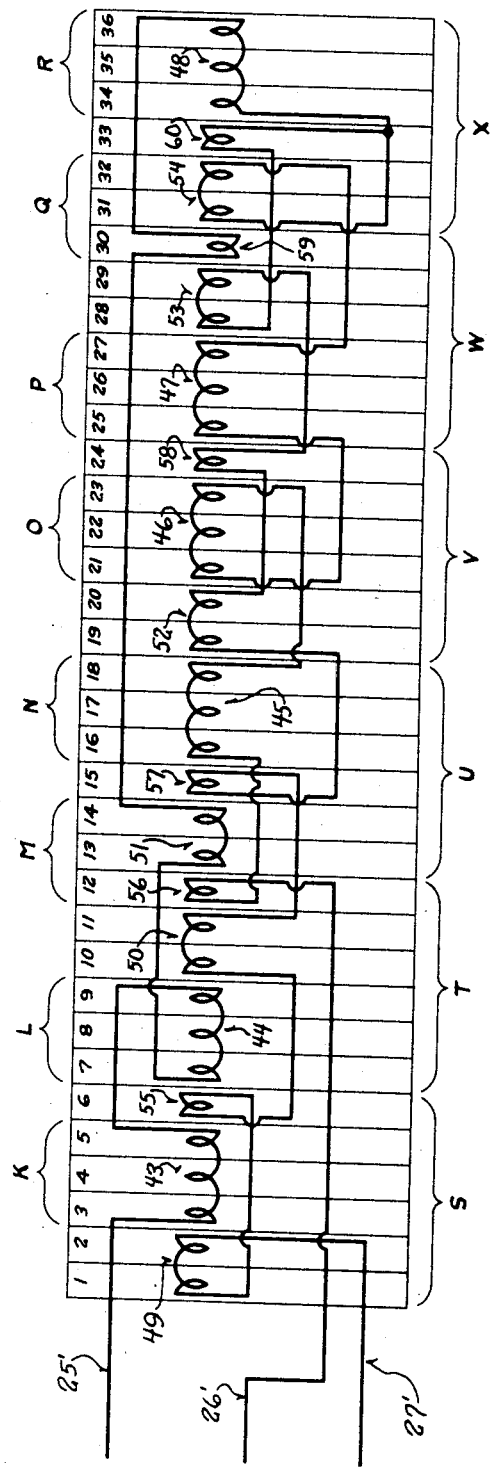
Figure 2 is a view similar to Figure 1 illustrating the application of this invention to a six and eight pole motor and showing the manner in which certain groups of coils are left out of the circuit.

In the embodiment of the invention just described, the stator has either four or six poles produced in the manner described. Obviously, however, the invention is not restricted to any specific number of poles, but is readily applicable to any suitable division in this respect; and in Figure 2, a six and eight pole construction is illustrated.

In this modification, as in the one previously described, the stator has thirty-six slots and the main winding consists of thirty-six coils; but the grouping of these coils is different. There are six groups of three adjacent coils each designated 43, 44, 45, 46, 47, and 48. In addition, there are six groups of two adjacent coils each designated 49, 50, 51, 52, 53, and 54. The remaining groups, namely, 55, 56, 57, 58, 59, and 60 are single coils.

In this embodiment of the invention the winding is divided into three winding sections, one consisting of the coils groups 43, 44, 51, 59 and 48; a second winding section consisting of the coil groups 56, 45, 46, 47 and 54; and a third winding section consisting of the coil groups 49, 55, 50, 57, 52, 58, 53 and 60, this latter winding section and its coil groups being substituted for the conductor 27 of the Figure 1 embodiment. All of these winding sections are connected to each other at one end to provide a common terminal, with their free ends providing end terminals connectible with the supply line.

Inasmuch as the speed selector switch employed in this embodiment of the invention is identical with that already described, its showing has not been repeated. It is to be understood, however, that when the selector switch is in its low speed position, the polarity of the groups of coils is such as to produce the maximum number of poles, which, in this instance, is eight; and when the switch is in its high speed position, the polarity of the groups of coils constituting the winding section connecting with the conductor 26' is reversed to produce a lesser number of poles, namely, six.

There is, however, one important distinction between this embodiment of the invention and the one previously described; and that is that on low speed, some of the coils are omitted in order to produce a greater torque. This will be clear from the following recitation of the circuits.

With the speed selector switch in its low speed position, current flows from line L¹ through conductor 25' connecting with the free end of the winding section containing the coil groups 43, 44, 51, 59 and 48. Current thus flows forwardly or in a counterclockwise direction through three coil group 43 and then backwardly or in a clockwise direction through the three coil group 44, then forwardly through the two coil group 51, forwardly through the single coil 59, and backwardly through the three coil group 48 to the common terminal of the winding sections, and enters the second winding section to which the conductor 26' is connected through the two coil group 54. Current thus flows forwardly through the two coil group 54, backwardly through the three coil group 47, forwardly through the three coil group 46, backwardly through the three coil group 45, forwardly through the single coil 56, and out on conductor 26' to line L². These two winding sections are thus connected in series while the third winding section to which the conductor 27' is connected is maintained out of the circuit by the selector switch.

This third winding section includes the two coil groups 49, 50, 52, and 53 and the single coils 55, 57, 58, and 60, and as stated, these coil groups are not in circuit. This series connection of the windings, therefore, produces eight three coil groups to form eight poles K, L, M, N, O, P, Q, and R. Poles K, L, N, O, P, and R are composed of single groups of three coils, while poles M and Q are composed of two coil and single coil groups added together.

When the speed selector switch is moved to its opposite high speed position, the two winding sections connecting with the conductors 25' and 26' are connected in parallel and the circuit completed through the third winding section to produce the desired lesser number of poles. In this instance, current flow is reversed in the winding section connecting with conductor 26', for current enters this line from L¹ to flow backwardly or in a clockwise direction through single coil 56, forwardly or in a counterclockwise direction through three coil group 45, backwardly through three coil group 46, forwardly through three coil group 47, and backwardly through the two coil group 54 to the common terminal of the three winding sections.

Current will also flow from line L¹ and conductor 25' forwardly through three coil group 43, backwardly through three coil group 44, forwardly through two coil group 51, forwardly through single coil 59, and backwardly through three coil group 48 to the common terminal of the three winding sections. The circuit from the first two winding sections is then completed through the third winding section which it enters at the single coil 60 to flow backwardly therethrough, forwardly through two coil group 53, backwardly through single coil 58, backwardly through two coil group 52, forwardly through single coil 57, backwardly through two coil group 50, forwardly through single coil 55 and forwardly through the two coil group 49 onto the conductor 27' and consequently to line L². Thus, it will be seen that the direction of current flow in the winding section constituting the coils 56, 45, 46, 47 and 54 is opposite from the direction of current flow therein in the low speed position of the switch.

In this manner, the direction of current flowing through the various groups of coils is such that six poles designated S, T, U, V, W, and X are formed. Pole S comprises two coil group 49, three coil group 43, and a single coil 55. The division of the coil groups between the remaining poles will be clear from the diagram.

In each instance, the pole comprises a sum of six coils; and as there are thirty-six slots in the stator, all of the coils are accounted for during high speed operation.

Also in this instance, there are two starting windings as in the embodiment illustrated in Figure 1, and the actuation of the selector switch connects the proper starting winding in circuit; but inasmuch as the arrangement of the starting windings is the same as that shown and described in conjunction with the embodiment shown in Figure 1, repetition thereof is deemed unnecessary.

From the foregoing description taken in connection with the accompanying drawings, it will be readily apparent to those skilled in the art that this invention provides an exceedingly simple manner of effecting two speed operation in a split phase motor and that the provision of a separate starting winding for each speed results in an exceptionally efficient motor.

What I claim as my invention is:

1. In an electric motor having a toothed stator: a main winding on the stator with its coils applied progressively thereto and with each coil embracing a plurality of stator teeth, said winding being divided into at least two sections connected to each other at one end, each winding section comprising a plurality of groups of coils connected in series; a connection between the free end of one winding section and one side of a supply line; means for connecting the other side of the supply line with the free end of the other winding section to place said two winding sections in series across the line; and means for also connecting the first designated side of the supply line with the free end of the second designated winding section and the second designated side of the supply line with the point of connection between the winding sections and for disconnecting said second designated side of the supply line from the free end of the second designated winding section to place said two winding sections in parallel across the line; the coil groups of said winding sections being so located circumferentially with respect to each other that coil groups of one winding section are interposed between coil groups of the other winding section, and the direction of current flow in the individual coil groups being such when the winding sections are serially connected across the supply line that the coil groups of the winding sections coact to produce a number of wound magnetic poles circumferentially of the winding with alternate poles of like polarity for operation of the motor at one speed while connection of the winding sections in parallel across the line reverses the direction of current flow in the second designated winding section and thereby effects combining of coil groups of the winding sections to produce a lesser number of wound magnetic poles, alternate ones of which are of like polarity, for operation of the motor at another speed.

2. In an electric motor having a toothed stator: a main winding on the stator with its coils applied progressively thereto and with each coil embracing a plurality of stator teeth, said winding being divided into three sections connected to each other at one end, each winding section comprising a plurality of groups of coils connected in series; a connection between the free end of one winding section and one side of a supply line; means for connecting the other side of the supply line with the free end of a second winding section to place said two winding sections in series across the line; and means for also connecting the first designated side of the supply line with the free end of the second winding section and the second designated side of the supply line with the free end of the third winding section and for disconnecting said second designated side of the supply line from the free end of the second winding section to place said first and second winding sections in parallel with each other and in series with the third winding section; the coil groups of said winding sections being so located circumferentially with respect to each other that coil groups of each winding section are interposed between coil groups of the other two winding sections, and the direction of current flow in the individual coil groups being such when the first and second winding sections are serially connected across the supply line that the coil groups of the winding sections coact to produce a number of wound magnetic poles circumferentially of the winding with alternate poles of like polarity, for operation of the motor at one speed, while connection of said first and second winding sections in parallel across the line completes the circuit through the third winding section and reverses the direction of current flow in the second winding section to thereby effect combining of coil groups of the winding sections to produce a lesser number of wound magnetic poles, alternate ones of which are of like polarity, for operation of the motor at another speed.

3. In an electric motor having a toothed stator: a main winding on the stator with its coils applied progressively thereto and with each coil embracing a plurality of stator teeth, said winding being divided into at least two sections connected to each other at one end, each winding section comprising a plurality of groups of coils connected in series and to have current flow in one direction in some of the coil groups and in the opposite direction in the remaining coil groups of each section at any given instant, the coil groups of the winding sections being so located circumferentially with respect to each other that coil groups of one winding section are interposed between coil groups of the other winding section; means for connecting the free end of one winding section with one side of a supply line; means for connecting the other side of the supply line with the free end of the other winding section to place the winding sections in series across the line; and means for also connecting the first designated side of the supply line with the free end of the second designated winding section and the second designated side of the supply line with the point of connection between the winding sections and for disconnecting said second designated side of the supply line from the free end of the second designated winding section to place said two winding sections in parallel across the line and to reverse the direction of current flow in all the coil groups of said second designated winding section.

4. In an electric motor of the character described: a single main stator winding comprising at least two winding sections each consisting of groups of coils serially connected in such a manner that current flows in one direction in some of the coil groups and in the opposite direction in the remaining coil groups at any given instant, said winding sections being applied to the stator with coil groups of one winding section circumferentially interposed between coil groups of the other winding section so that adjacent coil groups of the same polarity whether of the same winding section or not combine to form poles of the polarity of such combined coil groups, said winding sections being connected at one end to provide a winding terminal common to both winding sections while the opposite free ends of the winding sections provide end terminals; and means for selectively connecting either the end terminals with the two sides of a supply line to connect both sections in series across the line to produce one number of poles and one motor speed and/or connecting both end terminals with one side of the line and the common terminal with the other side of the line to thus connect the two winding sections in parallel across the line and thereby reverse the direction of current flow in one of the winding sections so as to effect a change in the number of poles for operation of the motor at another speed.

5. In an electric motor of the character described: a single main stator winding having its coils applied progressively to the stator and comprising at least two winding sections, each consisting of a number of groups of coils serially connected in such a manner that current flows in one direction in some of the coil groups and in the opposite direction in the remaining coil groups, said winding sections being connected at one end to provide a winding terminal common to both winding sections while the opposite free ends of the winding sections provide end terminals; and means for selectively connecting either the end terminals with the two sides of a supply line to connect the winding sections in series across the line and/or connecting both end terminals with one side of the line and the common terminal with the other side of the line to thus connect the two winding sections in parallel across the line, such parallel connection of the winding sections reversing the direction of current flow in one winding section; said winding sections being applied to the stator with coil groups of the winding section in which the direction of current flow is reversed circumferentially interposed between coil groups of the other winding section at such points that the interposed coil groups will have current flow therein in the same direction as the current flow in an adjacent coil group of the other winding section when the winding sections are connected in parallel, whereby the coil groups of the winding sections combine to produce a number of composite coil groups each defining a wound magnetic pole for operation of the motor at one speed, and that the reversal of the direction of current flow in said interposed coil groups consequent to reconnecting the winding sections in series across the line separates said interposed coil groups from said composite coil groups and produces additional poles for operation of the motor at a slower speed.

6. In an electric motor of the character described: a single main stator winding having its coils applied progressively to the stator and comprising at least two winding sections, each consisting of a number of groups of coils serially connected in such a manner that current flows in one direction in some of the coil groups and in the opposite direction in the remaining coil groups, said winding sections being connected at one end to provide a winding terminal common to both winding sections while the opposite free ends of the winding sections provide end terminals; and means for selectively connecting either the end terminals with the two sides of a supply line to connect the winding sections in series across the line and/or connecting both end terminals with one side of the line and the common terminal with the other side of the line to thus connect the two winding sections in parallel across the line, such parallel connection of the winding sections reversing the direction of current flow in one winding section; said winding sections being applied to the stator with coil groups of the winding section in which the direction of current flow is reversed circumferentially interposed between coil groups of the other winding section at such points that the interposed coil groups will have current flow therein in the same direction as the current flow in an adjacent coil group of the other winding section when the winding sections are connected in parallel, whereby the coil groups of the winding sections combine to produce a number of composite coil groups each defining a wound magnetic pole for operation of the motor at one speed, and that the reversal of the direction of current flow in said interposed coil groups consequent to reconnecting the winding sections in series across the line separates said interposed coil groups from said composite coil groups and effects combining of some of said interposed coil groups with other adjacent coil groups of said other winding section to form additional wound magnetic poles for operation of the motor at a slower speed.

7. In an electric motor of the character described: a single main stator winding having its coils applied progressively to the stator and comprising three winding sections, each consisting of a number of groups of coils serially connected in such a manner that current flows in one direction in some of the coil groups and in the opposite direction in the remaining coil groups in each winding section at any given instant, said winding sections being connected together at one end to provide a winding terminal common to all of the winding sections while the opposite free ends of the winding sections provide end terminals, each of the winding sections being applied to the stator with coil groups thereof circumferentially interposed between coil groups of the other two winding sections so that circumferentially adjacent coil groups of the same polarity whether of the same winding section or not combine to form poles of the polarity of such combined coil groups; and means including a two position speed selector switch for selectively connecting either the end terminals of two of the winding sections with the two sides of a supply line in one position of the switch to connect only said two winding sections in series across the line while leaving the third winding section out of the circuit to produce one number of poles for operation of the motor at one speed and/or connecting the end terminals of said two winding sections with one side of the supply line and the end terminal of the third winding section with the other side of the supply line in the other position of the switch to reverse the direction of current flow in one of said two winding sections and to place said two winding sections in parallel with each other and in series with the third winding section to produce a lesser number of poles for operation of the motor at a higher speed.

WILBUR R. APPLEMAN.